No. 758,000. PATENTED APR. 19, 1904.
C. R. DAVIS.
SULKY LISTER PLOW AND PLANTER.
APPLICATION FILED JAN. 25, 1904.
NO MODEL. 4 SHEETS—SHEET 1.
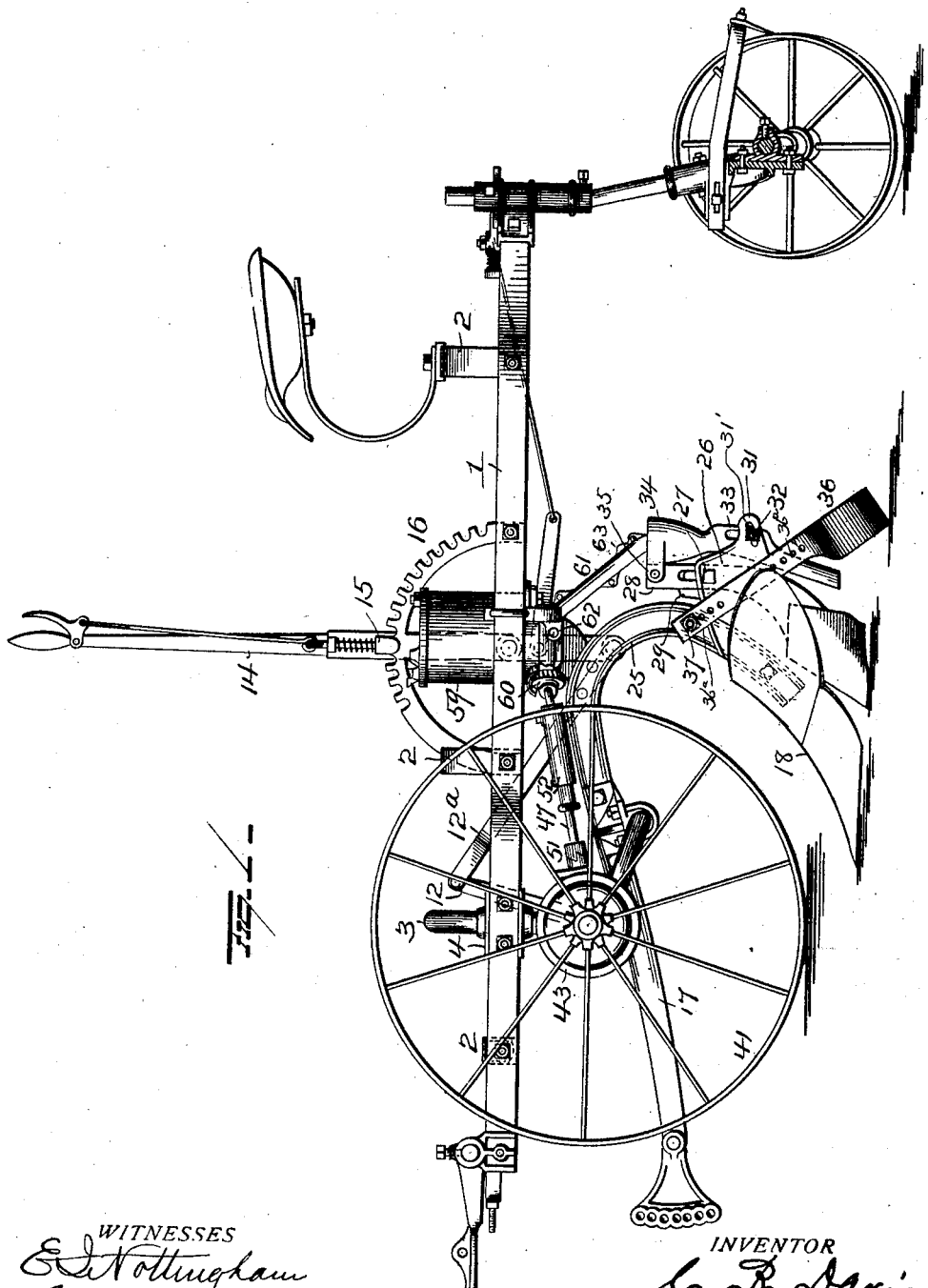
WITNESSES
INVENTOR
C. R. Davis
Attorney

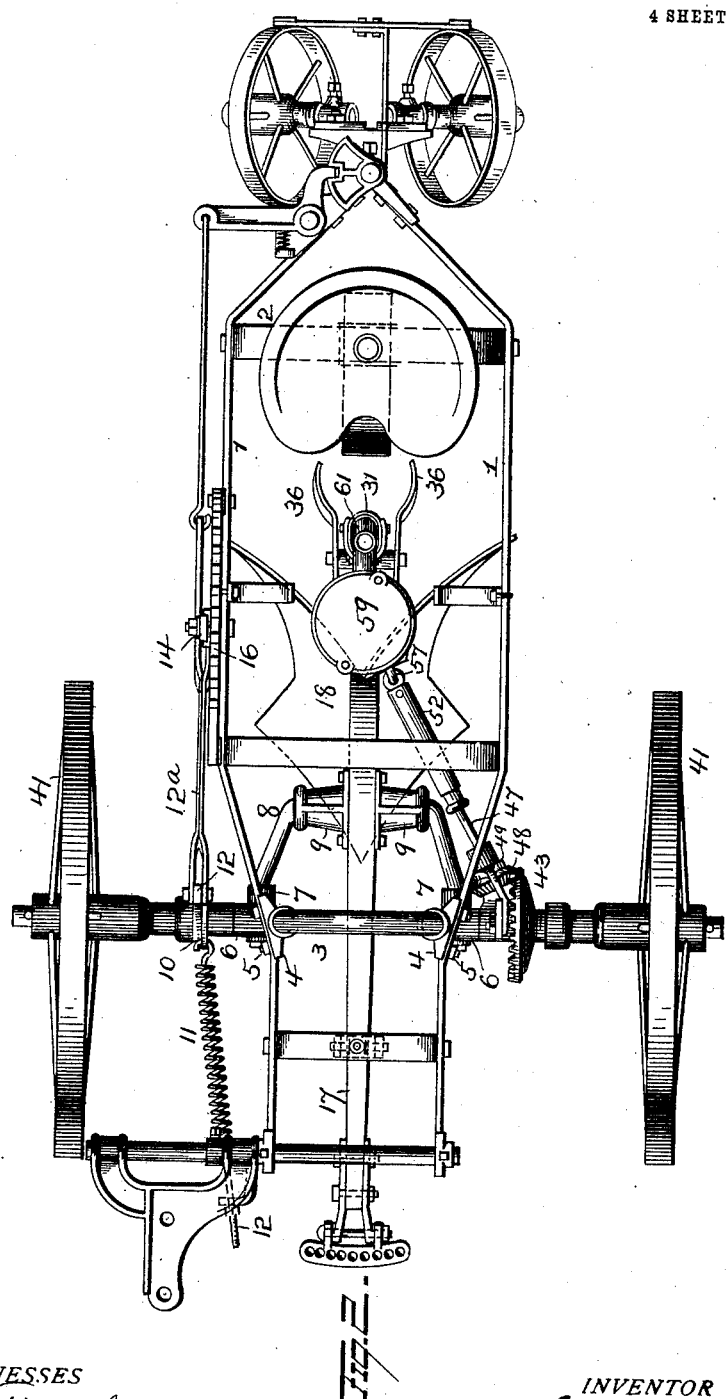

No. 758,000. PATENTED APR. 19, 1904.
C. R. DAVIS.
SULKY LISTER PLOW AND PLANTER.
APPLICATION FILED JAN. 25, 1904.
NO MODEL. 4 SHEETS—SHEET 3.
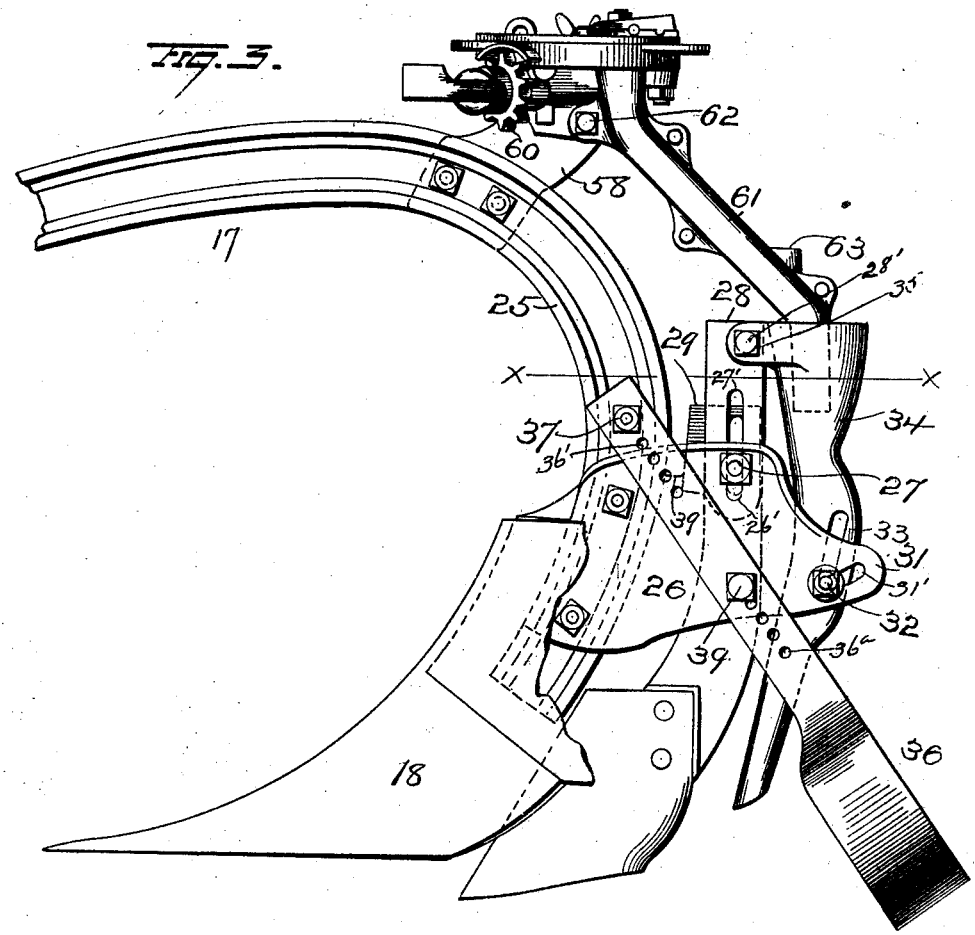
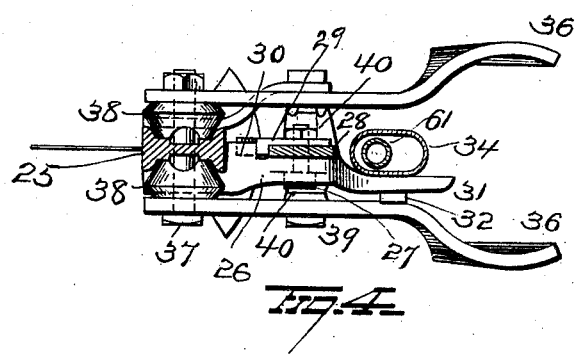
WITNESSES
INVENTOR
C. R. Davis
Attorney No. 758,000. PATENTED APR. 19, 1904.
C. R. DAVIS.
SULKY LISTER PLOW AND PLANTER.
APPLICATION FILED JAN. 25, 1904.
NO MODEL. 4 SHEETS—SHEET 4.
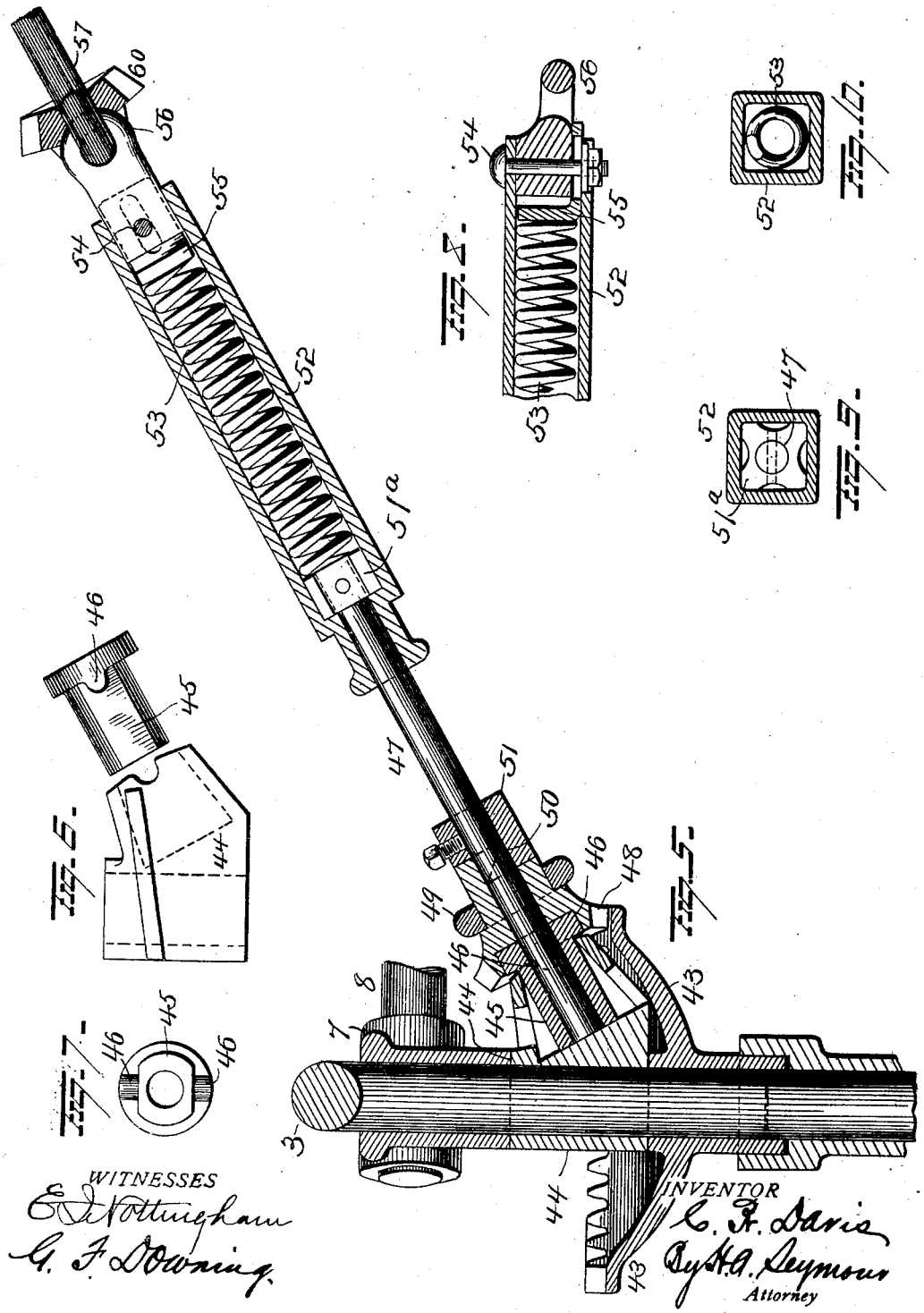
WITNESSES
E. J. Nottingham
G. F. Downing
INVENTOR
C. R. Davis
By H. A. Seymour
Attorney No. 758,000. Patented April 19, 1904.

UNITED STATES PATENT OFFICE.

CALVIN R. DAVIS, OF SOUTH BEND, INDIANA, ASSIGNOR TO OLIVER CHILLED PLOW WORKS, OF SOUTH BEND, INDIANA.

SULKY LISTER PLOW AND PLANTER.

SPECIFICATION forming part of Letters Patent No. 758,000, dated April 19, 1904.

Original application filed April 9, 1903, Serial No. 151,831. Divided and this application filed January 25, 1904. Serial No. 190,557. (No model.)

*To all whom it may concern:*

Be it known that I, CALVIN R. DAVIS, a resident of South Bend, in the county of St. Joseph and State of Indiana, have invented certain new and useful Improvements in Sulky Lister Plows and Planters; and I do hereby declare the following to be a full, clear, and exact description of the invention, such as will enable others skilled in the art to which it appertains to make and use the same.

My invention relates to improved sulky lister plows and planters, this application being a division of application for Letters Patent filed by me April 9, 1903, Serial No. 151,831.

An object of the invention is to provide improved seed-controlling mechanism and an improved subsoiler, seed-tube, conveyer-tube, and covering-hoes and improved mounting for all of them.

With this object in view the invention consists in certain novel features of construction and combinations and arrangements of parts, as will be more fully hereinafter described, and pointed out in the claims.

In the accompanying drawings, Figure 1 is a view in side elevation, illustrating my improvements. Fig. 2 is a top plan view. Fig. 3 is a view in side elevation. Fig. 4 is a view in section on the line $x\ x$ of Fig. 3, and Figs. 5, 6, 7, 8, 9, and 10 are enlarged views of details of construction.

1 represents the frame of my improved lister, which comprises two longitudinal bars bowed outward between their ends and connected at intermediate points by arched crossbars 2, three of which latter being shown. The axle 3 is bowed between its ends and secured to the side bars of frame 1 by means of brackets 4 and U-bolts 5 and carries at each side of its bowed portion sleeves 6, having integral sleeves 7 at right angles thereto, in which the ends of a yoke 8 are securely bolted. The intermediate portion of said yoke is mounted to rotate in brackets 9, secured to opposite sides of the beam 17 of my improved lister 18. One of said sleeves 6 has an integral arm 10, to which one end of a counterbalance or lifting spring 11 is connected, the other or forward end of said spring being adjustably secured in a bent bar 12, secured to one of the side bars of frame 1. This arm 10 has secured thereto an extension 12, which is pivotally secured by a bifurcated rod $12^a$ with one end of lifting-lever 14, which latter is fulcrumed between its ends on frame 1 and has a spring-pressed detent 15 to lock in any of the notches of a segment 16, secured to frame 1, and thus hold the lever and lister in any position to which they may be moved. To the downwardly-bent end of beam 17, which forms standard 25, a lister 18 is secured by means of a suitable frog bolted to the standard.

To the standard 25 a bracket 26 is securely bolted and provided with a slot 26' for the reception of a bolt 27, which latter is also passed through vertical elongated slots 27' in the subsoiler-standard 28, and a wedge-shaped plate 29, recessed to receive the standard 28 and locate its wedge portion between the forward edge of said standard and a lug 30 on bracket 26. It will thus be seen that the subsoiler can be adjusted vertically and set more or less on its point by adjusting the wedge-shaped plate 29 vertically.

An offset extension 31 is provided on bracket 26 and made with an inclined slot 31' to receive a bolt 32, also passed through an elongated vertical slot 33 in a web at the rear of seed-dropping tube 34, and hold the latter directly behind the subsoiler. The upper end of this seed-tube 34 has a forwardly-projecting lug 35, pivoted to the upper end of subsoiler-standard 28 by a bolt 28'. By so mounting the seed-tube its lower end can be adjusted back and forth, and as its connection with bracket 26 is through an inclined slot this pivotal adjustment of the tube varies its depth of planting. When the tube is set in the forward position, the seed will drop to the bottom of the furrow; but when set farther back more or less soil will fall to the bottom of the furrow in advance of the seed-tube, thus depositing the seed on pulverized soil. The amount of pulverized or loose soil on which the seed is deposited may therefore be regulated by adjusting the seed-tube back and forth.

Covering-hoes 36 are provided and have a series of bolt-openings 36' at their upper ends for the reception of a bolt 37 to secure them to the lister-standard 25 and are spaced therefrom by washers 38. The intermediate portions of said hoes 36 are also provided with a series of bolt-holes $36^a$ for the reception of a bolt 39, passed through the bracket 26, and spacing-washers 40 are located on the bolt 39 between the bracket 26 and hoes 36. The covering-hoes may be set to a greater or lesser depth by inserting the bolts into the different bolt-openings, so that the amount of soil required to cover the seed can be regulated to a nicety. The lower ends of the hoes are formed into twisted blades and the front edge made sharp and cutting. Said blades are twisted to the proper extent to concentrate the soil onto the seed. When the washers 40 are removed from bolt 39, the hoes are made to cut close up to the seed-bed, but may be set farther from the seed-bed by interposing washers 40. Thus the covering-hoes may be set to suit the different conditions of the soil, so as to cover the seed properly.

On the ends of axle 3 the main wheels 41 are mounted. One of these wheel-hubs may be made with internal notches at both ends, so that when in either position it will clutch with lugs on the hub of driving-gear 43, supported to turn on the axle. On the axle 3 adjacent to the gear 43 a casting 44 is mounted (see Figs. 5 and 6) and made with an elongated pocket, in which a bearing-sleeve 45 is mounted and has lugs or trunnions 46 on opposite sides of one end, supported in notches in the casting to give pivotal movement of the bearing in the pocket. This bearing 45 receives the forward end of a shaft 47, and a pinion 48 is mounted on this shaft 47 in mesh with driving-gear 43 and held in such position by a bracket 49, secured to casting 44 and made with a ring or collar encircling the hub of pinion 48 to hold it in proper working position. The hub of this pinion forms one clutch member with beveled or inclined clutch-teeth 50 to engage correspondingly-shaped teeth on a sleeve 51, secured to shaft 47 by a set-screw. The shaft 47 has an angular head $51^a$ secured thereon and mounted to move longitudinally in an angular sleeve 52, in which a spring 53 is mounted and presses against the head $51^a$ to always maintain the shaft extended longitudinally to proper working positition, but permit it to contract to compensate for adjustment or movement of the lister. In the upper end of sleeve, 52 an angle-bar 55 is secured by a bolt 54. This angle-bar 55 has a slot therein, which permits of its adjustment on bolt 54 to regulate the tension of the spring. The upper end of this angular sleeve 52 is connected by a universal joint 56 with the seed-dropping shaft 57, supported in suitable bearings on a bracket 58, secured to the upper end of the lister-standard. A seed-hopper 59 is secured on bracket 58, and its dropper is operated by a pinion 60 on shaft 57.

By making the clutch-teeth 50 inclined on one side, as shown, permits the pinion 48 to be turned in a reverse direction without operating the seed-dropper, and when the lister is elevated to its highest position the clutch member 51 will be drawn out of contact with the teeth 50 and permit the wheels and gear to turn without operating the seed-dropping mechanism, but will automatically clutch when the lister is lowered. By inclosing the spring 53 in the angular sleeve 52 I protect the same from dirt and trash, which would interfere with the perfect operation of the machine. Communicating with the outlet of the said hopper is a conveyer-tube 61, which is pivotally secured by a bolt 62 to the bracket 58, and its lower end rests in the upper wide end of seed-tube 34, which permits adjustment of the latter without disturbing the feed, and an opening 63 is provided in the top of conveyer-tube 61, so that the operator can see at all times whether or not the seed are properly dropping.

A great many changes might be made in the general form and arrangement of the parts described without departing from my invention, and hence I do not confine myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a lister-standard, a rearwardly-projecting bracket secured thereto, and a seed-dropping tube secured to the bracket, of covering-hoes having adjustable connection with both the standard and bracket to permit their longitudinal adjustment.

2. The combination with a lister-standard, a rearwardly-projecting bracket secured thereto, and a seed-dropping tube secured to the bracket, of covering-hoes secured to both the standard and bracket and longitudinally adjustable, and spacing-washers between the hoes and bracket to adjust the hoes laterally.

3. The combination with a lister-standard, a rearwardly-projecting bracket secured thereto, and a subsoiler and seed-tube carried by said bracket, of covering-hoes having series of bolt-openings near their ends and between their ends for the reception of bolts to adjustably secure them to the standard and bracket and said hoes twisted and made with forward cutting edges to force the soil onto the seed.

4. In a lister, the combination with an axle, a driving-gear thereon and a traction-wheel transmitting motion thereto, of a seed-dropper, a shaft for operating the same, a pinion on the shaft meshing with the driving-gear, a casting on the axle having notches, a sleeve in which the end of said shaft is mounted to turn, and lugs on the sides of said sleeve fulcrumed in the notches in the casting to permit of pivotal movement of the shaft.

5. In a sulky-lister, the combination with a frame, a lister carried thereby, means for raising and lowering the lister, an axle secured to the frame, and traction-wheels thereon, of a driving-gear on the axle clutched to one of the traction-wheels, a casting on the axle adjacent to the gear and having an elongated pocket therein, a sleeve projecting into said pocket and having lateral lugs at opposite sides of its rear end to fulcrum on the casting, a seed-dropper, a shaft for transmitting motion thereto supported at its end in said sleeve, a pinion loose on said shaft, a bracket projecting from the casting holding the pinion in mesh with the driving-gear, and a clutch on the shaft to lock the pinion thereto.

6. The combination with a seed-dropper, of a shaft for transmitting motion thereto, comprising an angular sleeve, a shaft having an angular head therein, a spring inclosed in said sleeve pressing against the head, and an angle-bar adjustably secured to the opposite end of the sleeve and against the spring to adjust the tension of the latter.

In testimony whereof I have signed this specification in the presence of two subscribing witnesses.

CALVIN R. DAVIS.

Witnesses:
 EDWIN NICAR,
 F. C. NIPPOLD.